(12) United States Patent
Bae et al.

(10) Patent No.: US 7,519,015 B2
(45) Date of Patent: Apr. 14, 2009

(54) METHOD OF PROVIDING PACKET DATA SERVICE IN A WIRELESS TELECOMMUNICATION SYSTEM

(75) Inventors: Beom-Sik Bae, Suwon (KR); Robert J. Marks, Homewood, IL (US)

(73) Assignee: Samsung Electronics Co., Ltd (KR)

( * ) Notice: Subject to any disclaimer, the term of this patent is extended or adjusted under 35 U.S.C. 154(b) by 1032 days.

(21) Appl. No.: 10/412,947

(22) Filed: Apr. 14, 2003

(65) Prior Publication Data

US 2003/0193964 A1     Oct. 16, 2003

(30) Foreign Application Priority Data

Apr. 13, 2002   (KR)   ................... 10-2002-0020254

(51) Int. Cl.
*G08C 17/00*   (2006.01)

(52) U.S. Cl. .................. 370/311; 370/331; 455/13.4; 455/127.1; 455/343.5; 455/438; 455/439; 455/574

(58) Field of Classification Search .................. 370/311, 370/328, 331; 455/13.4, 127.1, 343.1–343.6, 455/438, 439, 574
See application file for complete search history.

(56) References Cited

U.S. PATENT DOCUMENTS

| 6,208,634 B1* | 3/2001 | Boulos et al. ................ 370/342 |
| 6,515,970 B1* | 2/2003 | Lindsay et al. ............... 370/280 |
| 6,654,360 B1* | 11/2003 | Abrol .......................... 370/329 |
| 6,654,363 B1* | 11/2003 | Li et al. ....................... 370/338 |

(Continued)

FOREIGN PATENT DOCUMENTS

WO     WO 99/62223     12/1999

(Continued)

OTHER PUBLICATIONS

UK Search Report dated Sep. 17, 2003 issued in a counterpart application, namely, Appln. No. GB0308400.1.

(Continued)

*Primary Examiner*—Aung S Moe
*Assistant Examiner*—Christopher P. Grey
(74) *Attorney, Agent, or Firm*—The Farrell Law Firm, PC

(57) ABSTRACT

A method of determining whether a wireless packet data service can be activated in a dormant state. To activate one of a plurality of packet data services in the dormant state, a BS transmits to an MS a Page Message containing an SR ID identifying the service to be activated. If a service instance for the service is unavailable, the MS transmits to the BS a response message indicating that the service cannot be reconnected. The BS then terminates immediately, thereby saving radio resources and improving system performance.

17 Claims, 13 Drawing Sheets

U.S. PATENT DOCUMENTS

| | | | |
|---|---|---|---|
| 6,954,445 B1 * | 10/2005 | Wang et al. | 370/335 |
| 7,047,001 B2 * | 5/2006 | Chen | 455/422.1 |
| 7,180,879 B2 * | 2/2007 | Sinnarajah et al. | 370/335 |
| 7,227,848 B2 * | 6/2007 | Sayeedi et al. | 370/328 |
| 7,245,931 B2 * | 7/2007 | Wang et al. | 455/515 |
| 7,283,495 B2 * | 10/2007 | Lee et al. | 370/331 |
| 2001/0050907 A1 | 12/2001 | Madour et al. | |
| 2002/0077105 A1 * | 6/2002 | Chang | 455/436 |
| 2003/0073453 A1 * | 4/2003 | Basilier | 455/503 |
| 2003/0193911 A1 * | 10/2003 | Zhao et al. | 370/331 |
| 2004/0062227 A1 * | 4/2004 | Sayeedi | 370/350 |
| 2007/0217365 A1 * | 9/2007 | Rezaiifar et al. | 370/331 |

FOREIGN PATENT DOCUMENTS

| | | |
|---|---|---|
| WO | WO 00/13377 | 3/2000 |
| WO | WO 03/061221 A1 | 7/2003 |

OTHER PUBLICATIONS

European Search Report dated Jun. 2, 2003 issued in a counterpart application, namely, Appln. No. 03008060.0.

Sandip Sarkar et al., "The Paging Channel in CDMA2000", 1999 IEEE, Proceedings—IEEE International Conference on Networks (ICON'99), pp. 257-264.

3GPP2: "Data Service Options For Spread Spectrum Systems: CDMA2000 High Speed Packet Data Service Option 33", Aug. 21, 2000.

* cited by examiner

PAGE MESSAGE

| Field | Length(bits) |
|---|---|
| CONFIG_MGS_SEQ | 6 |
| ACC_MSG_SEQ | 6 |
| CLASS_0_DONE | 1 |
| CALSS_1_DONE | 1 |
| TMSI_DONE | 1 |
| ORDERED_TMSIS | 1 |
| BROADCAST_DONE | 1 |
| RESERVED | 4 |
| ADD_LENGTH | 3 |
| ADD_PFIELD | 8 x ADD_LENGTH |

PDU Format for a mobile station-addressed page

| SERVICE_OPTION | 0 or 16 |
|---|---|

FIG.5
(PRIOR ART)

| Service Option | | |
|---|---|---|
| Proprietary Indicator | Service Option Revision | Base Service Option Number |
| 1 bit | 3 bits | 12 bits |

FIG.6
(PRIOR ART)

| Service Option Number(Decimal) | Designated Use/Type of Service |
|---|---|
| 1 | Basic Variable Rate Voice Service(8 kbps) |
| 2 | Mobile Station Loopback(8 kbps) |
| ... | |
| 57 | 32 kbps Circuit Video Conferencing |
| 58 | 64 kbps Circuit Video Conferencing |
| 59 | HRPD Accounting Records Identifier |
| 60-4099 | Reserved for standard service options |
| 4100 | Asynchronous Data Service,Revision 1(9.6 or 14.4 kbps) |
| 4101 | Group 3 Facsimile,Revision 1(9.6 or 14.4 kbps) |
| 4102 | Reserved for standard service option |
| 4103 | Packet Data Service:Internet or ISO Protocol Stack, Revision 1(9.6 or 14.4 kbps) |
| 4104 | Packet Data Service:CDPD Protocol Stack, Revision 1(9.6 or 14.4 kbps) |
| 4105-32,767 | Reserved for standard service options |

FIG.7
(PRIOR ART)

PAGE RESPONSE MESSAGE

| Field | Length(bits) |
|---|---|
| MOB_TERM | 1 |
| SLOT_CYCLE_INDEX | 3 |
| MOB_P_REV | 8 |
| SCM | 8 |
| REQUEST_MODE | 3 |
| SERVICE_OPTION | 16 |
| PM | 1 |
| NAR_AN_CAP | 4 |
| ENCRYPTION_SUPPORTED | 0 or 4 |
| NUM_ALT_SO | 3 |
| ... | |

FIG.8
(PRIOR ART)

PAGE MESSAGE

| Field | Length(bits) |
|---|---|
| CONFIG_MGS_SEQ | 6 |
| ACC_MSG_SEQ | 6 |
| CLASS_0_DONE | 1 |
| CALSS_1_DONE | 1 |
| TMSI_DONE | 1 |
| ORDERED_TMSIS | 1 |
| BROADCAST_DONE | 1 |
| RESERVED | 4 |
| ADD_LENGTH | 3 |
| ADD_PFIELD | 8 x ADD_LENGTH |

PDU Format for a mobile station-addressed page

| SERVICE_OPTION | 0 or 16 |
|---|---|
| SR_ID | 0 or 3 |

FIG. 10

| 0... .... .... .... | standard service option number indicator |
| --- | --- |
| .111 1111 1111 1... | this value indicates that the service option number is being used to carry an SR_ID |
| .... .... .... .xxx | SR_ID of the dormant service instance |

| SO Number SR_ID | SR_ID | SO Number SR_ID | SR_ID |
| --- | --- | --- | --- |
| 7FF8 | 0 (reserved) | 7FFC | 4 |
| 7FF9 | 1 | 7FFD | 5 |
| 7FFA | 2 | 7FFE | 6 |
| 7FFB | 3 | 7FFF | 7 (reserved) |

FIG. 11

| Service Option Number(Decimal) | Designated Use/Type of Service |
|---|---|
| 1 | Basic Variable Rate Voice Service(8 kbps) |
| 2 | Mobile Station Loopback(8 kbps) |
| ... | |
| 57 | 32 kbps Circuit Video Conferencing |
| 58 | 64 kbps Circuit Video Conferencing |
| 59 | HRPD Accounting Records Identifier |
| 60-4099 | Reserved for standard service options |
| 4100 | Asynchronous Data Service,Revision 1(9.6 or 14.4 kbps) |
| 4101 | Group 3 Facsimile,Revision 1(9.6 or 14.4 kbps) |
| 4102 | Reserved for standard service option |
| 4103 | Packet Data Service:Internet or ISO Protocol Stack, Revision 1(9.6 or 14.4 kbps) |
| 4104 | Packet Data Service:CDPD Protocol Stack, Revision 1(9.6 or 14.4 kbps) |
| 4105-32,759 | Reserved for standard service options |
| 32,760 | Identifies service reference identifier 0 |
| 32,761 | Identifies service reference identifier 1 |
| 32,762 | Identifies service reference identifier 2 |
| 32,763 | Identifies service reference identifier 3 |
| 32,764 | Identifies service reference identifier 4 |
| 32,765 | Identifies service reference identifier 5 |
| 32,766 | Identifies service reference identifier 6 |
| 32,767 | Identifies service reference identifier 7 |

FIG. 12

METHOD OF PROVIDING PACKET DATA SERVICE IN A WIRELESS TELECOMMUNICATION SYSTEM

PRIORITY

This application claims priority under 35 U.S.C. § 119 to an application entitled "Method of Providing Packet Data Service in a Wireless Telecommunication System" filed in the Korean Industrial Property Office on Apr. 13, 2002 and assigned Serial No. 2002-20254, the contents of which are incorporated herein by reference.

BACKGROUND OF THE INVENTION

1. Field of the Invention

The present invention relates generally to a wireless telecommunication system, and in particular, to a method of determining whether a wireless packet data service can be activated in a dormant state with no traffic channel connected between a base station (BS) and a mobile station (MS).

2. Description of the Related Art

Wireless telecommunication systems such as code division multiple access (CDMA) 2000 provide $3^{rd}$ generation mobile communication. These $3^{rd}$ generation mobile communication systems support high-speed packet data service including moving pictures as well as voice service, as compared to traditional $2^{nd}$ generation mobile communication systems.

If traffic is not exchanged between a BS and an MS for a predetermined time after radio channels are connected for a packet data service, they exchange signaling messages and then enter a dormant state. The dormant state refers to a state where no traffic channels are connected between the BS and the MS, all channels in Layer 1 and Layer 2 are released, and information about the Layer 1 and 2 channels is deleted. Yet, the MS maintains a service instance for the packet data service in the dormant state. A service instance is defined as a process for enabling the packet data service to proceed and managing related connection information, specifically point-to-point protocol (PPP) connection information. The service instance is identified by a service reference identifier (SR ID).

In the dormant state, only the PPP connection information is managed. Upon generation of transmission data in the dormant state, the BS and the MS enter a reconnection state and perform the same operation as done for an initial call setup, excluding setup of the PPP connection. If the packet data service can be activated in the reconnection state, the BS and the MS transition to an active state and exchange packets.

To activate a particular service in the dormant state, the BS notifies the MS of only a service option indicating the type of the service. It may occur that two or more services having the same service option are in progress between the BS and the MS. For example, with the MS connected to a laptop computer, the MS and the laptop computer perform a video on demand (VOD) service and a file transfer protocol (FTP) service, respectively, by the same wireless connection. In this case, the MS runs two service instances for the VOD and FTP. Although the service instances have the same service option number, for example, 33, indicating the high-speed packet data service, they use separate PPP connections.

After establishing traffic channels and transitioning to the active state, the MS identifies the service to be activated by an SR ID received from the BS, and determines whether a corresponding service instance is available. If the MS is disconnected from the laptop computer in the dormant state, the FTP service is unavailable. When the BS requests activation of the FTP service by the SR ID identifying the FTP service, the MS releases the assigned traffic channels, considering the FTP service instance is unavailable.

Because the BS does not notify the MS of the SR ID indicating the service to be activated before the traffic channel assignment, the traffic channels are assigned and messages are exchanged for a service connection between them even if the MS cannot resume the service instance for the service. Thus, unnecessary signaling messages and traffic continue to be generated until the service is terminated and the MS and the BS occupy the assigned traffic channels until they confirm the unavailability of the service activation. As a result, radio resources are wasted and unnecessary time delay is produced until the termination of the service.

SUMMARY OF THE INVENTION

It is, therefore, an object of the present invention to provide a method of determining whether one of a plurality of data services can be activated in a dormant state in a wireless packet data communication system.

It is another object of the present invention to provide a method of terminating an unavailable service, thereby reducing waste of radio resources in a wireless packet data communication system.

It is a further object of the present invention to provide a method of rapidly terminating an unavailable service with minimum influence on a wireless packet data communication system.

The above and other objects are achieved by a method of determining whether one of a plurality of data services provided from a BS to an MS can be reconnected in a dormant state where service instances are maintained for the data services with no traffic channels connected in a wireless packet data communication system. The BS transmits to the MS a Page Message containing an SR ID identifying a data service to be activated among the data services. The MS then determines whether the service instance of the service indicated by the SR ID is available. If the service instance is not available, the MS transmits a response message indicating service rejection to the BS.

BRIEF DESCRIPTION OF THE DRAWINGS

The above and other objects, features, and advantages of the present invention will become more apparent from the following detailed description when taken in conjunction with the accompanying drawings in which:

FIG. 5 illustrates the structure of a conventional Page Message;

FIG. 6 illustrates the format of a SERVICE_OPTION field in the Page Message;

FIG. 7 illustrates an exemplary assignment of service option numbers;

FIG. 8 illustrates a structure of a conventional Page Response Message;

FIG. 10 illustrates the structure of a Page Message further including an SR_ID field according to an embodiment of the present invention;

FIG. 11 illustrates an example of service option numbers indicating SR IDs according to another embodiment of the present invention;

FIG. 12 illustrates an assignment of service option numbers to represent SR IDs according to the second embodiment of the present invention;

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. Particularly, specific details such as the structure of a Page Message and service option numbers indicating service types are provided for comprehensive understanding of the present invention. Therefore, it is obviously understood by those skilled in the art that the present invention can be implemented without them or with some modifications made to them.

The present invention provides a method of determining whether one of a plurality of services in a dormant state can be reconnected in a wireless packet data communication system. More specifically, in order to activate the service in the dormant state, a BS transmits an initial message containing an SR ID identifying the service to an MS. Before describing the decision as to the availability of the service reconnection, the operations of the BS and the MS for providing a packet data service in a conventional CDMA2000 system will first be described. The MS is connected to a packet data service node (PDSN) by wireless connection to the BS. The PDSN is responsible for connecting a mobile communication network to a packet communication network such as the Internet, and manages service instances between the MS and other various endpoints.

Figure 1:
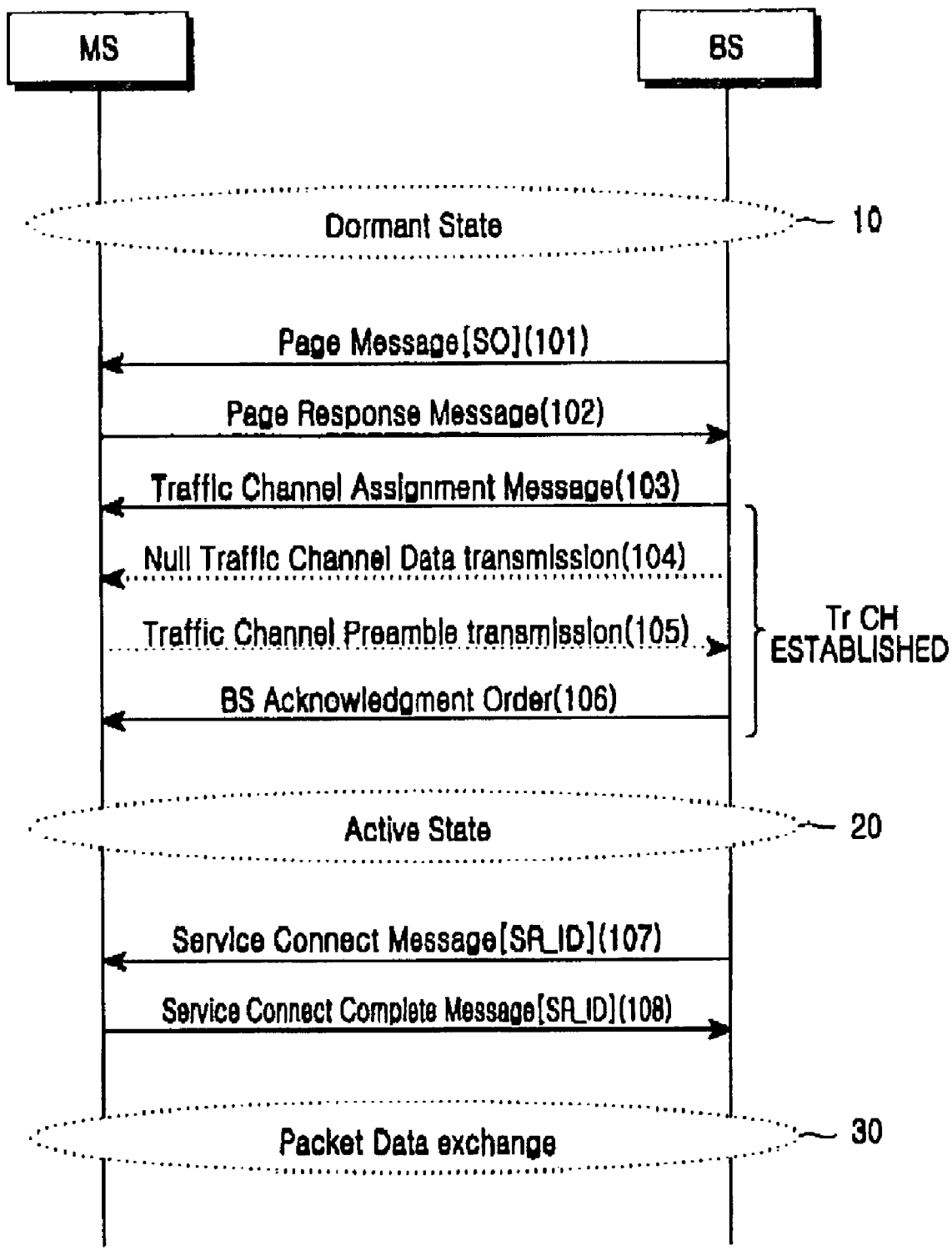
FIG. 1 is a diagram illustrating a signaling message flow for initiating a packet data service normally after transition from a dormant state to an active state in a CDMA2000 system to which the present invention is applied.

FIG. 1 is a diagram illustrating a signaling message flow for normally initiating a packet data service after transition from a dormant state to an active state in a CDMA2000 system to which the present invention is applied. A plurality of ongoing services between a BS and an MS are in the dormant state and the MS maintains service instances for the services.

Referring to FIG. 1, upon generation of a packet for a particular service in a dormant state 10, the BS transmits a Page Message to the MS on a paging channel to activate the service in step 101. The Page Message contains a service option number indicating the type of the service. Service types are classified into a voice call involving various voice codings, a data call supporting various data rates, and a test call according to system implementation.

In step 102, the MS transmits a Page Response Message to the BS in response to the Page Message. The Page Response Message contains a service option number indicating a service to be activated when the service is in the dormant state. The Page Message is intended here for the same use as initial service connection. The BS assigns forward and reverse traffic channels. The BS then transmits to the MS a Traffic Channel Assignment Message containing traffic channel assignment information in step 103 and null data on the forward traffic channel in step 104.

Upon receipt of the Traffic Channel Assignment Message, the MS establishes the forward and reverse traffic channels, checks reception of the forward traffic (i.e., null data), and transmits a preamble on the reverse traffic channel to the BS in step 105. In step 106, the BS transmits a BS Acknowledgement Order to the MS. Thus, the forward and reverse traffic channels are completely established and the BS and the MS transition to an active state 20.

To reconnect the service, the BS transmits a Service Connect Message containing an SR ID identifying the service to the MS in step 107. The MS then determines whether a service instance for the service is available. If it is available, the MS transmits a Service Connect Complete Message to the BS in step 108. Thus, the packet data service is initiated and packets for the service are exchanged between the BS and the MS, as indicated by reference numeral 30.

If the BS determines that service parameters are to be renegotiated after transitioning to the active state 20, it transmits a Service Request Message containing new service parameters to the MS before transmitting the Service Connect Message. Since the Service Request Message includes the SR ID, the MS can determine whether the service instance is available by the SR ID. If the service is available, the MS transmits a Service Response Message to the BS and awaits receipt of the Service Connect Message for the service reconnection.

An SR ID is a 3-bit value indicating a service instance for a particular service. If the SR ID is 0, it indicates signaling. If the SR ID is 7, it indicates a null service. Therefore, an SR ID is set to an unused value among 1 to 6, for a service instance, which is generated each time a service is connected by a wireless connection.

The service instance is a process for managing all information required to enable a service to proceed, i.e., service-related configuration information such as a service option number, a multiplex (MUX) option number, radio link protocol (RLP) information, and a logical-to-physical mapping table (LPM). When the service is completely released, the service instance is deleted and its SR ID is available to any other service instance. The SR ID is included in the header of a packet datagram unit (PDU) for the purpose of indicating the service of a packet transmitted between the BS and the MS.

Figure 2:
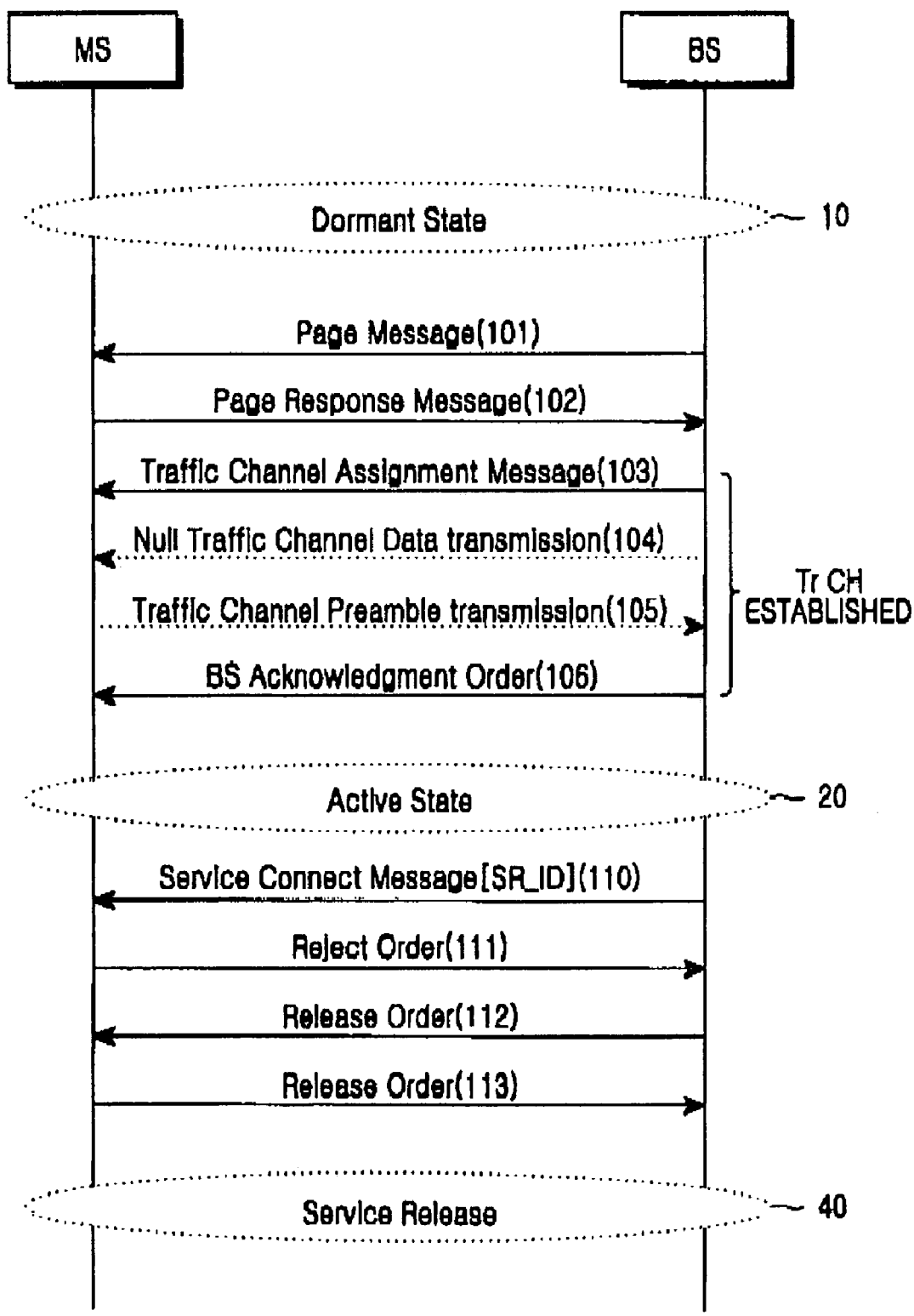
FIG. 2 is a diagram illustrating a conventional signaling message flow for terminating a service when the service cannot be activated in a dormant state in the CDMA2000 system.

On the contrary, if the service instance corresponding to the SR ID is not available, the MS performs an operation illustrated in FIG. 2, considering that the service cannot be reconnected. FIG. 2 is a diagram illustrating a conventional signaling message flow for terminating the service when the service cannot be reconnected in the dormant state in the CDMA2000 system. Steps 101 to 106 are performed in the same manner as depicted referring to FIG. 1 and thus will not be described here.

Referring to FIG. 2, when the MS determines that the service instance corresponding to the SR ID is not available in step 110, it transmits a Reject Order to the BS in step 111. The BS then transmits a Release Order to the MS and releases the already assigned traffic channels in step 112. The MS also transmits a Release Order to the BS and removes the service instance, rendering the SR ID available to a different service instance in step 113.

Figure 3:
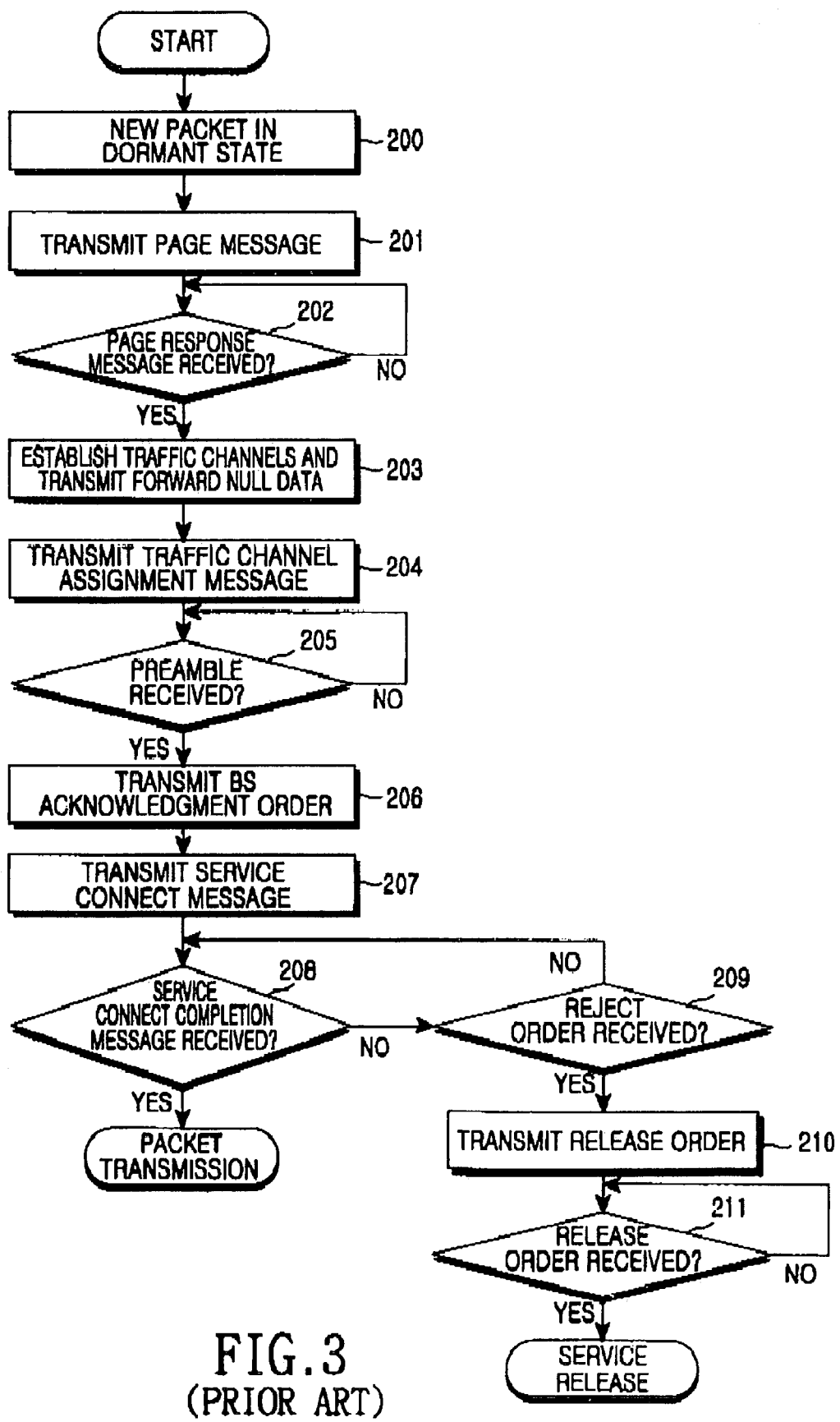
FIG. 3 is a flowchart illustrating an operation of a BS in correspondence with the signal flows illustrated in FIGS. 1 and 2.
Figure 4:
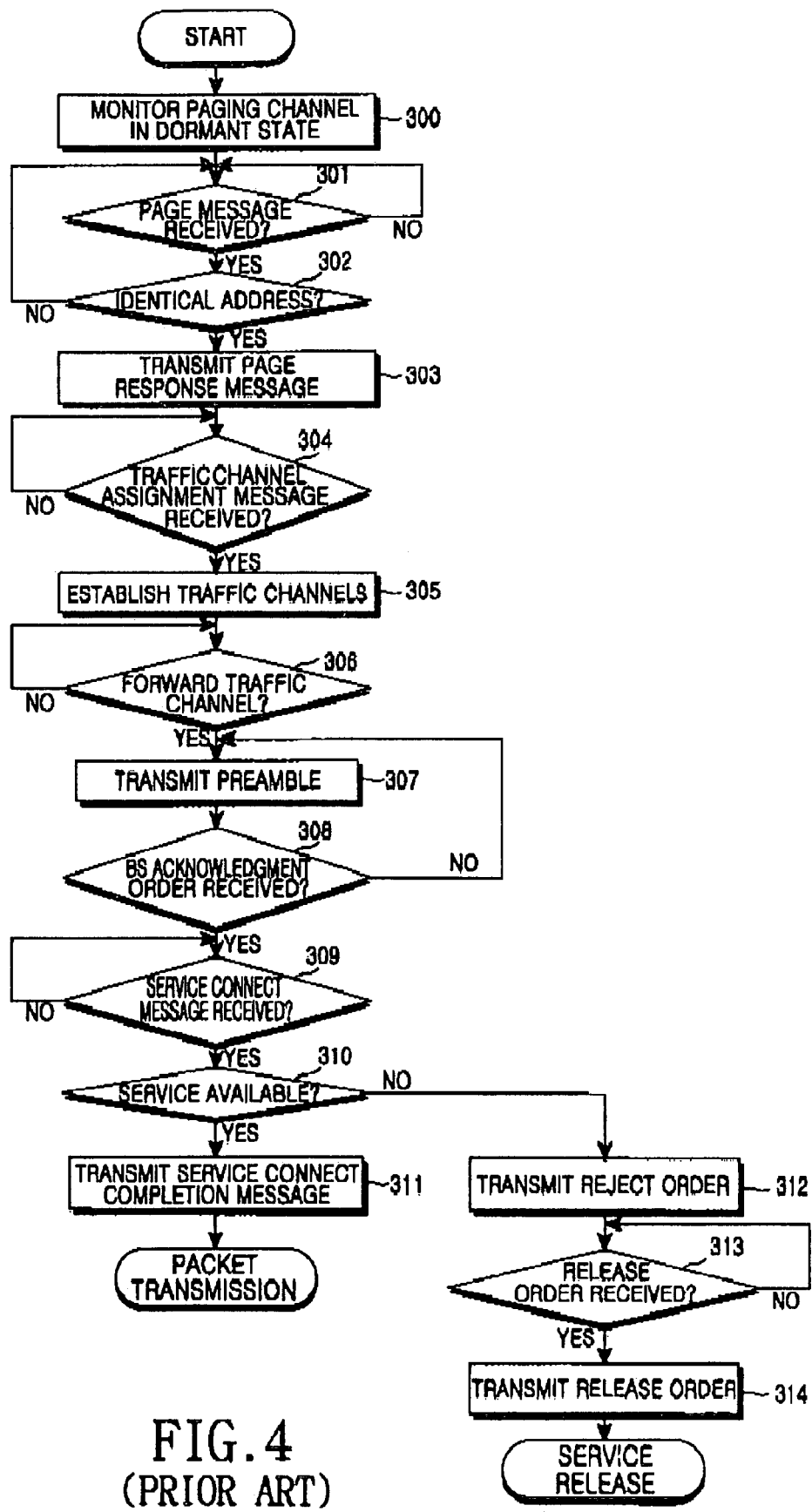
FIG. 4 is a flowchart illustrating an operation of an MS in correspondence with the signal flows illustrated in FIGS. 1 and 2.

The operations of the BS and the MS in correspondence with the signal flows illustrated in FIGS. 1 and 2 are depicted in FIGS. 3 and 4, respectively.

Referring to FIG. 3, upon generation of a new packet for a particular service in the dormant state in step 200, the BS transmits the Page Message containing the service option number of the service to the MS on a paging channel in step 201. The MS then determines from the service option number whether the service can be reconnected in step 202. If the service option number is '0×0000', the MS determines that the service reconnection is not available. Since the availability of the service has already been verified at the initial connection of the service, the Page Response Message has the service option number set in the Page Message. Therefore, when the service is activated in the dormant state, the BS always determines from the Page Response Message that the service is available.

In step 203, the BS assigns traffic channels for the service and transmits null traffic data to the MS on the forward traffic channel. The BS then transmits the Channel Assignment Message to the MS in step 204. Upon receipt of a preamble from the MS on the reverse traffic channel in step 205, the BS transmits the BS Acknowledgement Order to the MS in step 206.

In step 207, the BS transmits to the MS the Service Connect Message containing the SR ID indicating the service to be reconnected and awaits receipt of a response from the MS. Upon receipt of the Service Connect Complete Message from the MS in step 208, the BS starts to exchange packets with the MS, considering that the service connection is available. Otherwise, if the BS does not receive the Service Connect Completion Message in step 208, it awaits receipt of the Reject Order from the MS in step 209. Upon receipt of the Reject Order, the BS transmits the Release Order to the MS in step 210 and receives the Release Order from the MS in step 211. The BS then releases the traffic channels and terminates the service.

Referring to FIG. 4, the MS, monitoring the paging channel in step 300, receives the Page Message from the BS in step 301. If a recipient address included in the Page Message is different from that of the MS in step 302, the MS returns to step 300 and monitors the paging channel. If they are identical, the MS determines from the service option number included in the Page Message whether the type of the service to be reconnected can be supported. Since the MS has determined to support the service type, when the service is reconnected in the dormant state, the service is initially connected. Therefore, the MS always determines that the service type is supportable. The MS then transmits the Page Response Message to the BS in step 303. The Page Response Message contains the service option number set in the Page Message to indicate the availability of the service type. Upon receipt of the Channel Assignment Message in step 304, the MS establishes forward and reverse traffic channels according to assignment information included in the Channel Assignment Message in step 305. The MS receives null traffic data on the forward traffic channel, thus confirming normal setup of the forward traffic channel in step 306 and transmits a preamble on the reverse traffic channel to the BS in step 307. The MS continues transmission of the preamble, considering that the forward and reverse traffic channels have not been established, until the MS receives the BS Acknowledgement Order from the BS in step 308.

Upon receipt of the Service Connect Message from the BS in step 309, the MS determines whether the service instance for the service identified by an SR ID included in the Service Connect Message among a plurality of ongoing services is available. If the service instance is available, the MS transmits the Service Connect Completion Message to the BS in step 311 and starts to exchange packets with the BS. Otherwise, if the service instance is not available in step 310, the MS transmits the Reject Order to the BS in step 312. Upon receipt of the Release Order in step 313, the MS transmits the Release Order to the BS in step 314. The MS then releases the traffic channels and terminates the service instance.

FIGS. 5 to 8 illustrate the structures of the conventional Page Message and Page Response Message used to initiate a packet data service in the dormant state. Specifically, FIG. 5 illustrates a format of the conventional Page Message. As illustrated in FIG. 5, the conventional Page Message contains a 16-bit SERVICE_OPTION field having a service option number.

FIG. 6 illustrates the format of the SERVICE_OPTION field. Referring to FIG. 6, 1 bit is assigned to Proprietary Indicator, 3 bits are used for Service Option Revision, and the other 12 bits indicate Base Service Option Number. The 15 bits, not including the Proprietary Indicator, are used to indicate a service option number.

FIG. 7 illustrates an example of service option numbers. Service types including an 8-kbps voice call, a loopback call, etc. are represented with the use of the service option numbers. In FIG. 7, 4105 to 32,767 are reserved.

FIG. 8 illustrates a format of the conventional Page Response Message. Referring to FIG. 8, the conventional Page Response Message contains a SERVICE_OPTION field indicating a service option number.

As described above, upon generation of a packet for a service in the dormant state, the BS transmits the Page Message to the MS to request reconnection of the service. Since the Page Message is configured for an initial service connection, it contains only a service option number indicating the type of the service to be connected. With a plurality of services connected by a single wireless connection, each service is identified by its SR ID. In the present invention, therefore, the Page Message is configured to further include an SR ID so that the availability of a particular service is determined rapidly.

Figure 9:
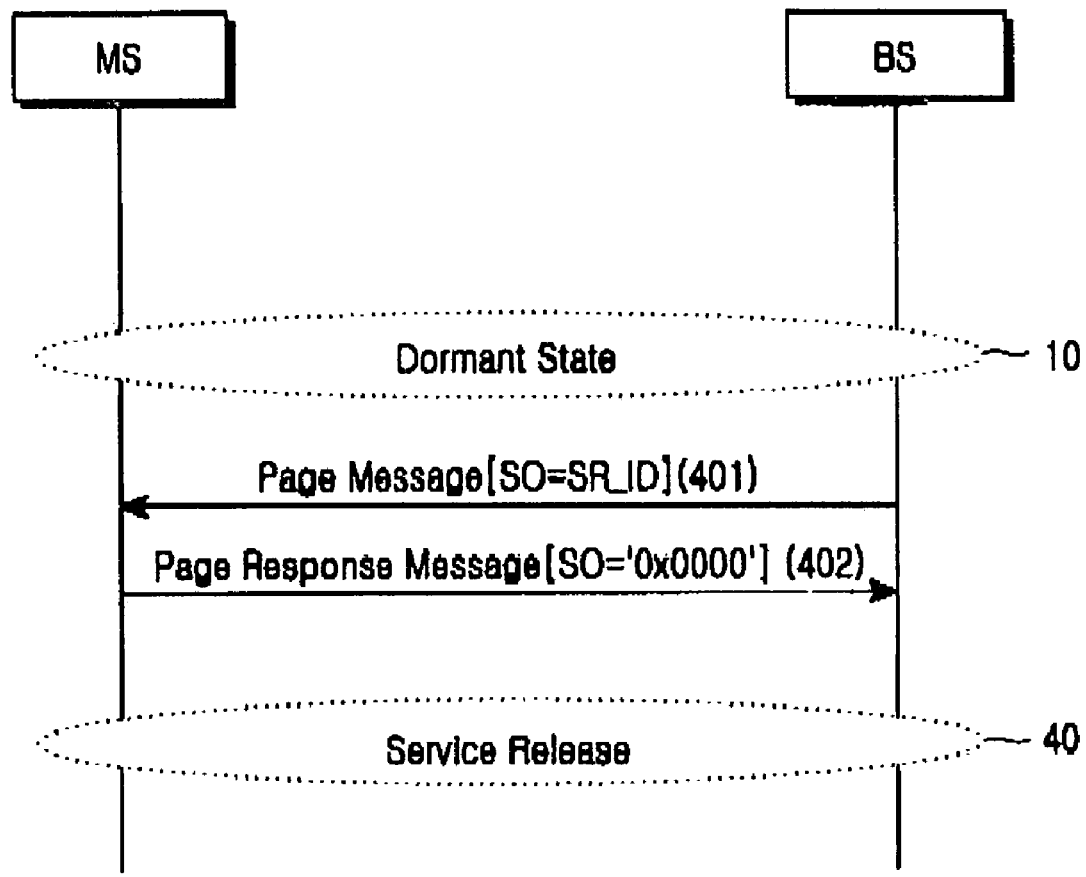
FIG. 9 is a diagram illustrating a signaling message flow for terminating a service if the service cannot be activated in the dormant state according to the present invention.

FIG. 9 is a diagram illustrating a signaling message flow for terminating a service when the service cannot be reconnected in a dormant state according to the present invention. Referring to FIG. 9, upon generation of a new packet for a particular service in the dormant state 10, the BS transmits to the MS a Page Message containing a service option number indicating the type of the service and an SR ID identifying the service in step 401. The format of the Page Message will be described later in detail. The MS determines, referring to the SR ID, whether a service instance for the service is available. If the service instance is available, the MS transmits to the BS a Page Response Message containing the SR ID or the service option number. The MS then assigns traffic channels and initiates the packet data service by renegotiating service parameters when necessary.

Alternatively, if the service instance is unavailable, the MS transmits to the BS the Page Response Message indicating service connection rejection, for example, "0×0000", or the Reject Order in step 402, and releases the service as indicated by reference numeral 40. Since the traffic channels have not been assigned yet, the BS and the MS need not exchange the Release Orders.

FIG. 10 illustrates the format of the Page Message including an SR_ID information field according to an embodiment of the present invention. As compared to the general Page Message illustrated in FIG. 5, the Page Message of the present invention includes a 3-bit SR_ID field indicating an SR ID in addition to a 16-bit SERVICE_OPTION field.

Aside from service reconnection in the dormant state, the Page Message is also used for initial call connection. Therefore, addition of an information field to the Page Message causes unnecessary load at the initial call connection. Thus, it can be contemplated as another embodiment that the Page Message is configured to include an SR ID without any modification to the conventional Page Message by assigning some of the reserved service option numbers as illustrated in FIG. 7 to represent SR IDs.

FIG. 11 illustrates the format of the SERVICE_OPTION field for providing an SR ID according to the second embodiment of the present invention. The first bit of the 16-bit SERVICE_OPTION field is always 0. The $2^{nd}$ to $13^{th}$ bits are all 1s to indicate that the field represents an SR ID, and the other 3 bits are assigned to indicate the SR ID of a dormant service instance.

FIG. 12 illustrates an assignment of service option numbers to represent SR IDs according to the second embodiment of the present invention. Referring to FIG. 12, service option numbers 0×7FF8 (32,760) to 0×7FFF (32,767) are assigned to represent SR IDs 0 to 7. For example, if a laptop computer is connected to the MS, and the mobile MS and the laptop perform VOD and FTP, respectively, through a single wireless connection, the MS runs two service instances for the VOD and the FTP. Although the service instances have the same service option number indicating a high-speed packet data service, e.g., 33, they are connected to corresponding servers via a BS by use of separate connections, usually PPP connections and have their own specific SR IDs.

If no packets are generated for both services for a predetermined time, the MS releases radio traffic channels and transitions to the dormant state, maintaining the service instances. Upon generation of a packet for the FTP in the dormant state, the BS requests the MS to resume the FTP by the SR ID identifying the FTP. The SR ID is included in an initial Page Message transmitted to the MS in the dormant state.

If the user has disconnected the MS from the laptop, the MS cannot use the FTP service instance any more. Thus, the MS transmits a Page Response Message indicating service connection rejection, or a Reject Order to the BS and the BS then terminates the FTP.

Alternatively, the service instance may be unavailable when an effective timer set to a predetermined time expires. Upon receipt of a Page Message requesting reconnection of the service instance, the MS transmits a Page Response Message indicating service connection rejection or a Reject Order to the BS. The BS then terminates the service.

Figure 13:
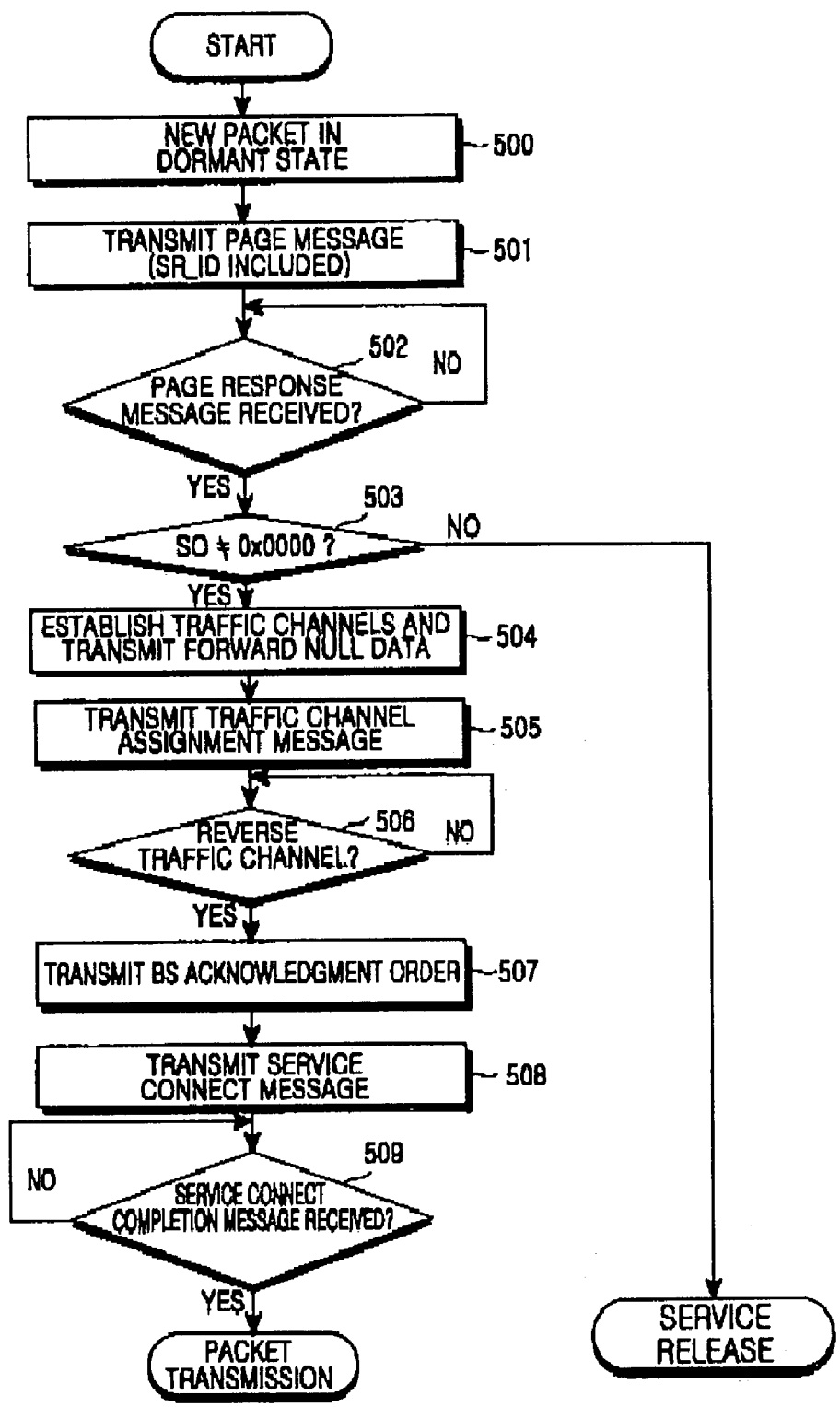
FIG. 13 is a flowchart illustrating an operation of the BS in correspondence with the signal flow illustrated in FIG. 9.
Figure 14:
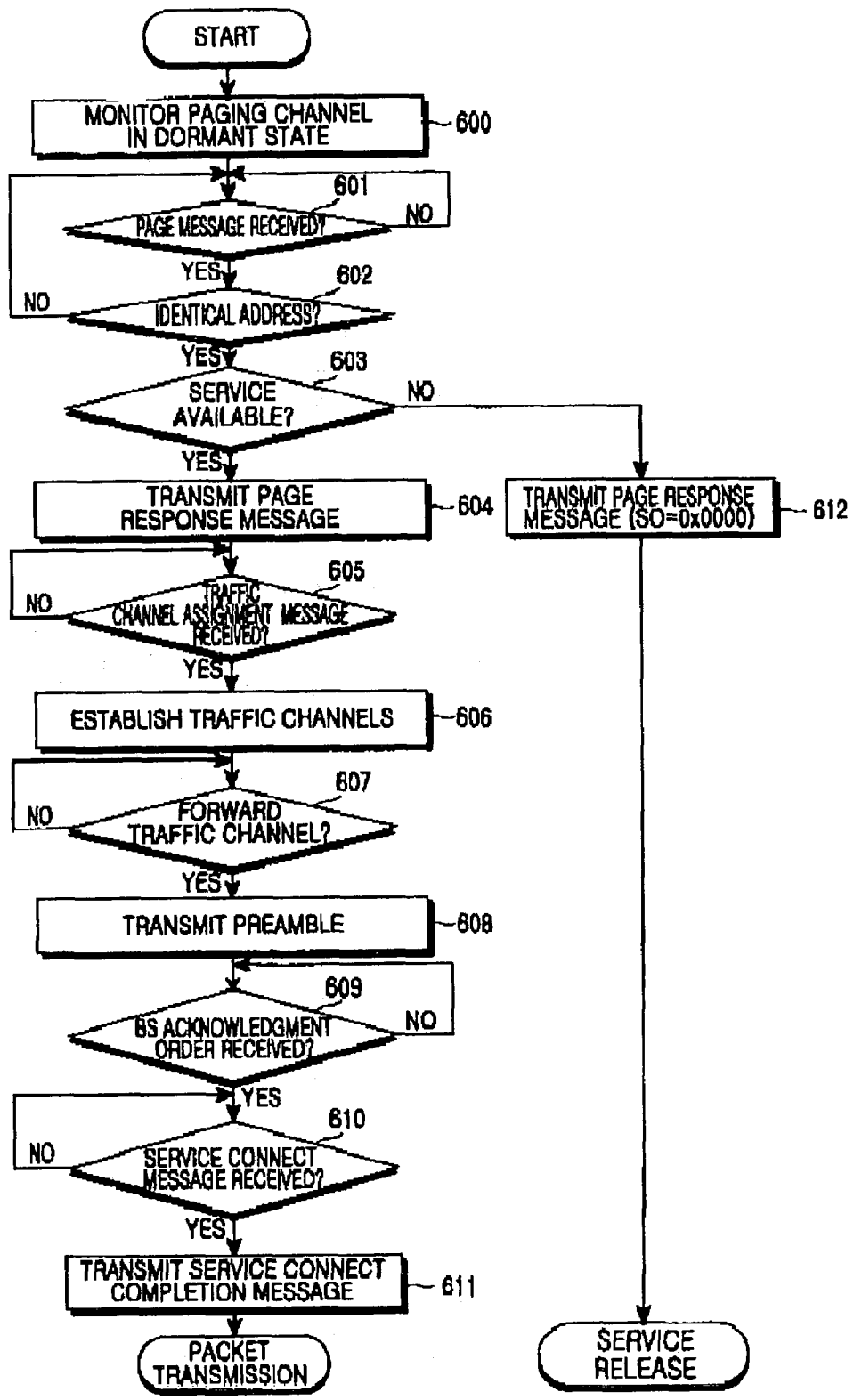
FIG. 14 is a flowchart illustrating an operation of the MS in correspondence with the signal flow illustrated in FIG. 9.

FIGS. 13 and 14 are flowcharts illustrating the operations of the BS and the MS in correspondence with the signal flow illustrated in FIG. 9. Referring to FIG. 13, upon generation of a new packet for a service in the dormant state in step 500, the BS transmits to the MS the Page Message containing the SR ID of the service on a paging channel in step 501. The SR ID is set in a separately procured information field, or it is set to a predetermined service option number in a SERVICE_OPTION field. Upon receipt of the Page Response Message from the MS in step 502, the BS determines from a service option number included in the Page Response Message whether the service can be reconnected, that is, whether a service instance for the service is available in step 503. If the service option number is '0×0000" indicating the unavailability of the service, the BS terminates the service. If the service option number is any other value, the BS assigns forward and reverse traffic channels for the service and starts to transmit null traffic data on the forward channel in step 504. In step 505, the BS transmits the Channel Assignment Message containing traffic channel assignment information to the MS. Upon receipt of a preamble on the reverse traffic channel in step 506, the BS transmits the BS Acknowledgment Order to the MS, notifying completed traffic channel assignment in step 507.

The BS transmits the Service Connect Message to the MS in step 508. When the BS receives a Service Connect Completion Message from the MS in step 509, it starts to exchange packets with the MS.

Referring to FIG. 14, the MS monitors the paging channel in the dormant state in step 600. Upon receipt of the Page Message containing a recipient address and the SR ID of a service to be connected in step 601, the MS determines whether its address is identical to the received recipient address in step 602. If they are different, the MS returns to step 600 to continue to monitor the paging channel. If the addresses are identical, the MS determines from a service option number, that is, the SR ID included in the Page Message, whether the service can be reconnected, that is, whether a service instance for the service is still available in step 603. If the service is not available, the MS goes to step 612.

Otherwise, if the service is available in step 603, the MS transmits a Page Response Message to the BS in step 604. The Page Response Message contains the service option number (i.e., the SR ID) included in the Page Message to notify the availability of the service reconnection.

Upon receipt of the Channel Assignment Message from the BS in step 605, the MS establishes forward and reverse traffic channels according to assignment information included in the Channel Assignment Message in step 606. After confirming normal establishment of the forward channel by receiving null traffic data on the forward traffic channel in step 607, the MS starts to transmit a preamble on the reverse traffic channel in step 608. If the MS receives the BS Acknowledgment Order from the BS in step 609, it determines that the forward and reverse traffic channels have been established successfully.

Upon receipt of the Service Connect Message from the BS in step 610, the MS transmits the Service Connect Completion Message to the BS in step 611 and starts to exchange packets with the BS.

As indicated above, if the service instance is unavailable in step 603, the MS transmits the Page Response Message containing a service option number set to '0×0000' to the BS, indicating the unavailability of the service in step 612. It can be further contemplated as another embodiment that if the service instance is unavailable, the MS transmits a Reject Order in response to the Page Message. The MS then terminates the service instance.

In accordance with the present invention as described above, a service instance for a particular service is terminated immediately when it is determined that the service cannot be reconnected in a dormant state. Therefore, radio resources consumption is reduced and system performance is improved. Furthermore, the general Page Message is still used without any modification simply by assigning some of service option numbers to represent SR IDs that identify corresponding service instances. As a result, the present invention is applicable to existing systems.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of determining in a base station (BS) whether one of a plurality of data services provided to a mobile station (MS) can be reconnected in a wireless packet data communication system, the method comprising the steps of:

transmitting a page message containing a service reference identifier (SR ID) identifying a data service to be activated among the data services to the MS in a dormant state where service instances are maintained for the data services with no traffic channels connected;

receiving a response message for the page message from the MS; and reconnecting or terminating the data service according to the response message.

2. The method of claim 1, wherein the data service is terminated if the response message indicates service rejection.

3. The method of claim 1, wherein the BS enters an active state and connects the traffic channels to the MS if the response message indicates service reconnection.

4. The method of claim 1, wherein the page message includes the SR ID in a service option number field indicating a type of the service to be activated.

5. The method of claim 1, wherein the page message includes the SR ID in an SR ID-specific field.

6. The method of claim 1, wherein the response message is a page response message.

7. The method of claim 1, wherein the response message is a reject order indicating an unavailability of the service reconnection.

8. A method of determining in a mobile station (MS) whether one of a plurality of data services received from a base station (BS) can be reconnected in a wireless packet data communication system, the method comprising the steps of:

receiving a page message containing a service reference identifier (SR ID) identifying a data service to be activated among the data services from the BS in a dormant state where service instances are maintained for the data services with no traffic channels connected;

determining whether the service instance of the service indicated by the SR ID is available; and transmitting to the BS a response message according to the determination result.

9. The method of claim 8, wherein the response message indicates service reconnection if the service instance is available.

10. The method of claim 9, further comprising the step of connecting the traffic channels to the BS, entering an active state, and reconnecting the data service after the response message transmitting step.

11. The method of claim 8, wherein the response message indicates service rejection if the service instance is unavailable.

12. The method of claim 11, further comprising the step of terminating the data service after the response message transmitting step.

13. The method of claim 8, wherein the page message includes the SR ID in a service option number field indicating a type of the service to be activated.

14. The method of claim 8, wherein the page message includes the SR ID in an SR ID-specific field.

15. The method of claim 8, wherein in the determining step the MS determines whether a user computer that performs the service by a connection to the BS via the MS is normally connected to the MS.

16. The method of claim 8, wherein the response message is a page response message.

17. The method of claim 8, wherein the response message is a reject order indicating an unavailability of the service reconnection.

* * * * *